(12) United States Patent
Sawarkar et al.

(10) Patent No.: US 11,868,329 B2
(45) Date of Patent: Jan. 9, 2024

(54) MULTIDIMENSIONAL CUBE MULTIVARIATE REGRESSION

(71) Applicant: International Business Machines Corporation, Armonk, NY (US)

(72) Inventors: Kunal Sawarkar, Franklin Park, NJ (US); Jerome Kafrouni, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/664,227

(22) Filed: May 20, 2022

(65) Prior Publication Data

US 2023/0376472 A1 Nov. 23, 2023

(51) Int. Cl.
*G06F 16/22* (2019.01)
*G06F 16/901* (2019.01)

(52) U.S. Cl.
CPC ...... *G06F 16/2264* (2019.01); *G06F 16/2246* (2019.01); *G06F 16/2272* (2019.01); *G06F 16/9024* (2019.01)

(58) Field of Classification Search
CPC ............. G06F 16/2264; G06F 16/2246; G06F 16/2272; G06F 16/9024
See application file for complete search history.

(56) References Cited

U.S. PATENT DOCUMENTS

| 7,181,450 | B2 | 2/2007 | Malloy |
| 7,627,555 | B2 | 12/2009 | MacLennan |
| 8,600,709 | B2 | 12/2013 | Guild |
| 8,713,072 | B2 | 4/2014 | Stolte |
| 9,633,091 | B2 | 4/2017 | Stolte |
| 10,482,394 | B2 | 11/2019 | Syed |
| 11,030,177 | B1 * | 6/2021 | Slayton ............... G06F 16/2282 |
| 2002/0016781 | A1 | 2/2002 | Jannarone |

(Continued)

FOREIGN PATENT DOCUMENTS

TW 201907305 A 2/2019

OTHER PUBLICATIONS

Boehm et al., "SystemDS: A Declarative Machine Learning System for the End-to-End Data Science Lifecycle", arXiv:1909.02976v2 [cs.DB] Jan. 8, 2020, 8 pages.

(Continued)

*Primary Examiner* — Huawen A Peng
(74) *Attorney, Agent, or Firm* — Randy Tejeda

(57) ABSTRACT

One or more computer processors facilitate compatibility between one or more multivariate regression models and a multidimensional dataset, wherein the program instructions. The one or more computer processors extract a plurality of unidimensional chains from the multidimensional dataset. The one or more computer processors double index the plurality of extracted unidimensional chains. The one or more computer processors construct a plurality of partial fit regression trees from the double indexed unidimensional (Continued)

chains. The one or more computer processors, responsive to a stop criterion, calculate one or more predictions utilizing the plurality of constructed partial fit regression trees. The one or more computer processors repopulate the multidimensional dataset with the one or more calculated predictions.

20 Claims, 14 Drawing Sheets

(56) References Cited

U.S. PATENT DOCUMENTS

| | | | | |
|---|---|---|---|---|
| 2010/0153064 | A1* | 6/2010 | Cormode | G06F 17/18 709/224 |
| 2019/0188311 | A1* | 6/2019 | Pounds | G06F 16/283 |
| 2019/0243865 | A1* | 8/2019 | Rausch | G06F 16/907 |
| 2019/0272764 | A1* | 9/2019 | Thomas | G09B 7/02 |
| 2021/0232559 | A1* | 7/2021 | Frese | G06F 16/906 |
| 2021/0319004 | A1* | 10/2021 | Walters | G06F 16/285 |
| 2022/0058169 | A1* | 2/2022 | Amzal | G06F 18/2148 |
| 2022/0058450 | A1* | 2/2022 | Lin | G06N 3/08 |
| 2022/0148016 | A1* | 5/2022 | Fang | G06F 16/283 |
| 2022/0237211 | A1* | 7/2022 | Gottin | G06F 16/906 |
| 2022/0358111 | A1* | 11/2022 | Zoldi | G06F 16/2264 |

OTHER PUBLICATIONS

Chan et al., "Regression Cube: A Technique for Multidimensional Visual Exploration and Interactive Pattern Finding", (Dec. 2013), DOI:http://dx.doi.org/10.1145/0000000.0000000, 31 pages.

Chen et al., "Multi-Dimensional Regression Analysis of Time-Series Data Streams", Proceedings of the 28th VLDB Conference, Hong Kong, China, 2002, 12 pages.

Fu, Lixin, "Construction of Decision Trees Using Data Cube", (2005), DOI:10.5220/0002509801190126, 8 pages.

Palamuttam et al., "SciSpark: Applying In-memory Distributed Computing to Weather Event Detection and Tracking", 2015 IEEE International Conference on Big Data, 7 pages.

Varga et el., "SM4MQ: A Semantic Model for Multidimensional Queries", Springer, 2017, 15 pages, <https://upcommons.upc.edu/bitstream/handle/2117/113242 sm4mq_withDOI.pdf>.

Yamamoto et al., Extracting Unidimensional Chains From Multidimensional Datasets: A Graph Theory Approach, Feb. 1980, 34 pages.

* cited by examiner

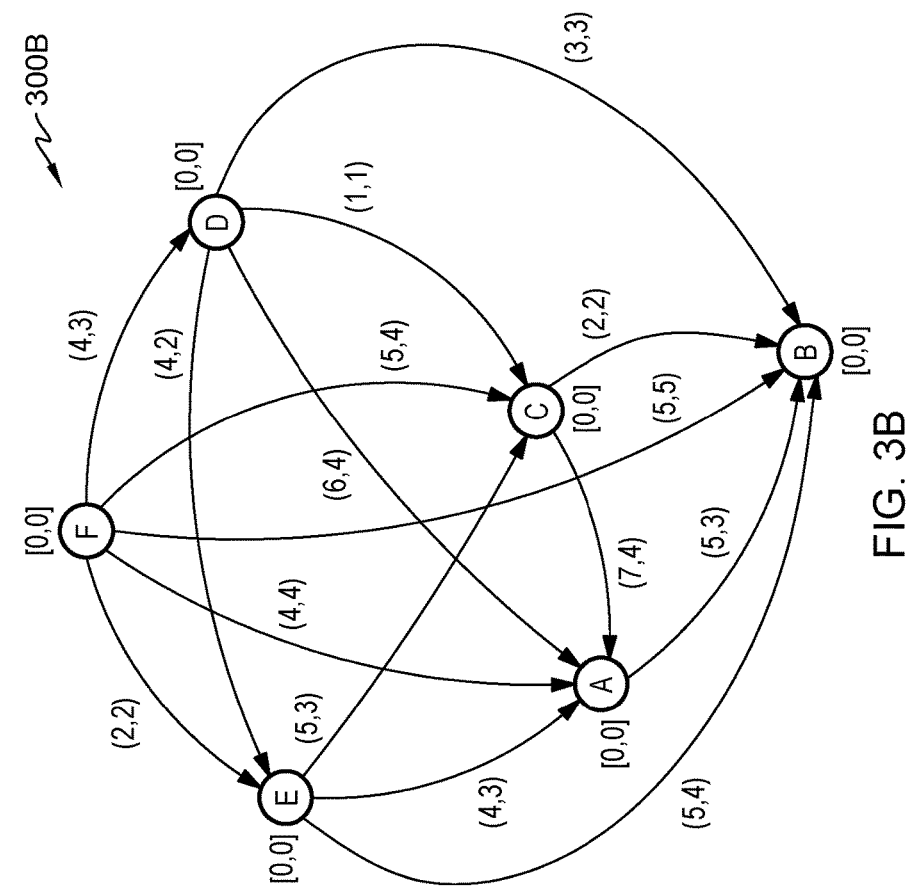

user1 is-friend-of user2

ADD myindex 0 spo: user1: is-friend-of: user1

FIG. 4A

Query: "who are all the people user1 is friends with?"
RANGEBYLEX myindex "[spo: user1: is-friend-with:"
" [spo: user1: is
1) "spo: user1: is-friend-of: user2"
2) "spo: user1: is-friend-of: user3"
3) "spo: user1: is-friend-of: user4"

FIG. 4B

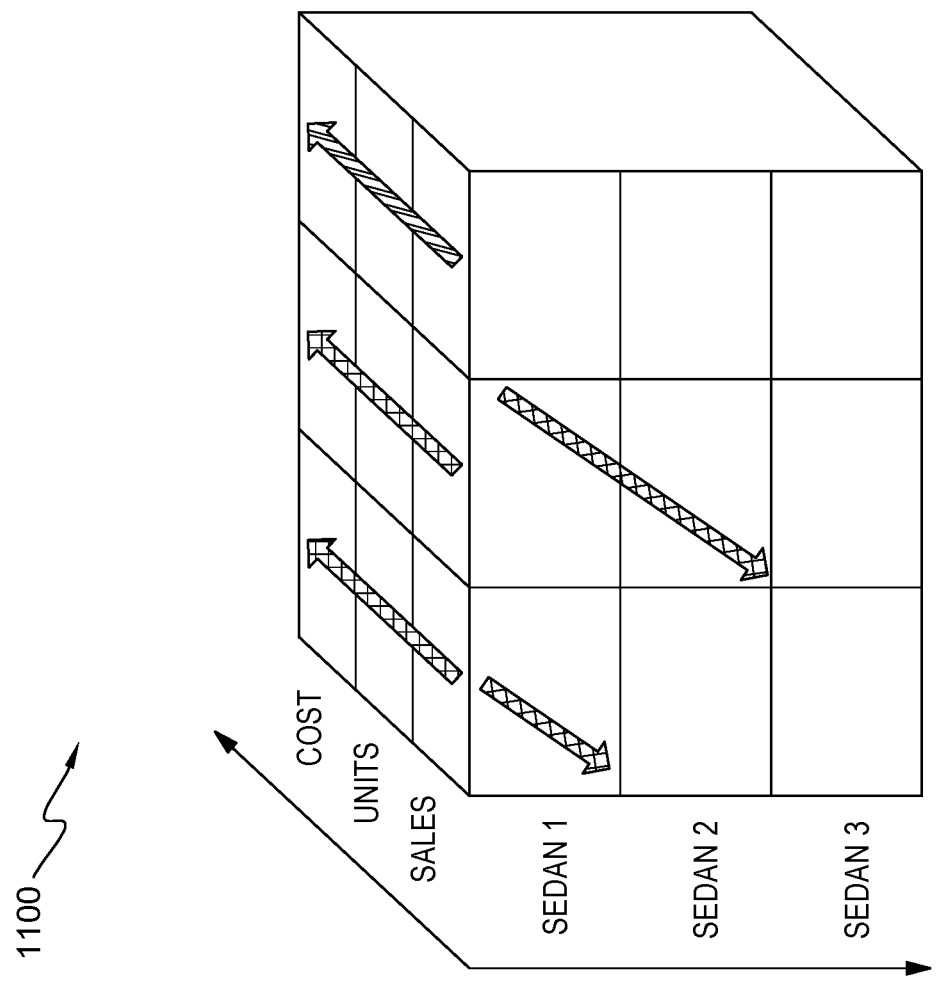
FIG. 11A
FIG. 11B
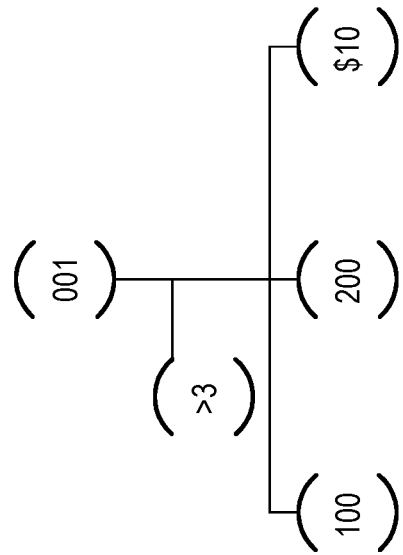
FIG. 11C

MULTIDIMENSIONAL CUBE MULTIVARIATE REGRESSION

BACKGROUND

The present invention relates generally to the field of machine learning, and more particularly to multidimensional data structures.

In multidimensional cube systems, each cell in a cube contains a tracking measure in an analysis where the cube stores data against one or more measures. The cube is formed with dimensions that identify how to organize the data or the measures that an analytical system (e.g., MOLAP) should track. Here, one element in each dimension identifies the location of a cell in the cube. The data is stored and indexed with the level of adjacency or in sequence such that retrieval speeds are improved.

SUMMARY

Embodiments of the present invention disclose a computer-implemented method, a computer program product, and a system. The computer-implemented method includes one or more computer processers facilitating compatibility between one or more multivariate regression models and a multidimensional dataset, wherein the program instructions. The one or more computer processors extract a plurality of unidimensional chains from the multidimensional dataset. The one or more computer processors double index the plurality of extracted unidimensional chains. The one or more computer processors construct a plurality of partial fit regression trees from the double indexed unidimensional chains. The one or more computer processors. The one or more computer processors, responsive to a stop criterion, calculate one or more predictions utilizing the plurality of constructed partial fit regression trees. The one or more computer processors repopulate the multidimensional dataset with the one or more calculated predictions.

BRIEF DESCRIPTION OF THE DRAWINGS

FIGS. 3A and 3B are an illustrative cube within the computational environment of FIG. 1, in accordance with an embodiment of the present invention;

FIGS. 4A and 4B are an illustrative hexastore within the computational environment of FIG. 1, in accordance with an embodiment of the present invention;

FIGS. 11A, 11B, and 11C illustrate a regression fitted cube within the computational environment of FIG. 1, in accordance with an embodiment of the present invention;

DETAILED DESCRIPTION

Figure 1:
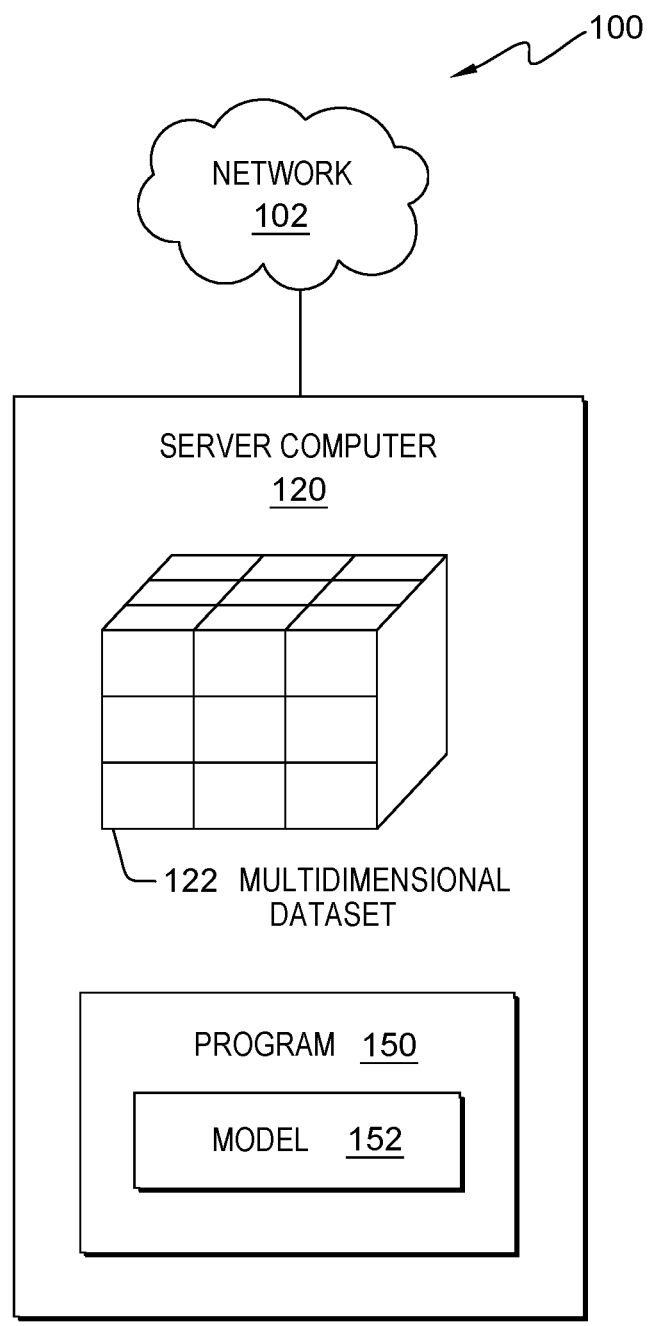
FIG. 1 is a functional block diagram illustrating a computational environment, in accordance with an embodiment of the present invention.

Multidimensional cube systems are traditionally designed for fast analytics, specifically rapid analytical queries (e.g., aggregating, filtering, etc.). Multidimensional cube systems are used by end users (e.g., business, and financial managers) to derive instant meaning from dynamic models and fields such as stock markets, finances, natural or planetary sciences. Traditional cube architecture includes multidimensional online analytic processing (MOLAP), hybrid online analytic processing (HOLAP), or relational online analytic processing (ROLAP), where some architectures logical approximations of cube data structure in a relational space. While multidimensional cubes are suited for conducting high level analytics, however, said cubes are not designed for conducting native machine learning. In addition, many modern software packages are not designed to accept data cubes as data structures.

Traditional multidimensional cube systems lack flexibility due to said systems treating all dimensions the same way, despite whether associated cubes contain elements that identify measures or describe how to organize the measures. Said cube systems conduct all queries in memory and are supported by physical memory. In addition, said cube systems are incompatible with most machine learning algorithms that are designed to train and run within relational or flat data environments. For example, regression algorithms utilize matrix algebra, which is inefficient with multidimensional datasets. If a user intends to apply machine learning on data stored in multidimensional cube, then the user is required to transform the data into machine learning friendly format. For example, the user is required to flatten the data into comma-separate values (CSV) in order to perform machine learning. This approach is computationally intensive while computationally slow which is counterproductive for the fast analytics required by such systems.

Embodiments of the present invention propose a method to bring machine learning and associated models closer to multidimensional data such that machine learning techniques and models are able to run natively with multidimensional cubes without any data conversion into flat data formats. Embodiments of the present invention generate and access a mapping layer, at the time of creation of cubes, containing additional metadata information for associating ease of data with applicability of machine learning models directly on a multidimensional dataset. Embodiments of the present invention present multivariate regression for multidimensional datasets. Embodiments of the present invention propose dual index scheme consisting of representation blocks plus hex relationships for accessing the trees which has both primary & secondary indexing to cube structure; whereby allowing use of a plurality of extracted unidimensional chains from traditionally inaccessible multidimensional cubes. Embodiments of the present invention recognize that computational resources are conserved when data conversion is reduced or eliminated. Embodiments of the present invention recognize that computational efficiency and speed are improved through native machine learning in multidimensional data environments. Embodiments of the present invention facilitate compatibility between one or more multivariate regression models and multidimensional dataset(s). Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes multidimensional dataset 122 and program 150. In other embodiments, server computer 120 may contain other applications, databases, programs, etc. which have not been depicted in computational environment 100. Server computer 120 may include internal and external hardware components, as depicted, and described in further detail with respect to FIG. 14.

Multidimensional dataset (cube) 122 is a repository for data used by program 150. In the depicted embodiment, multidimensional dataset 122 resides on server computer 120. In another embodiment, multidimensional dataset 122 may reside elsewhere within computational environment 100 provided program 150 has access to multidimensional dataset 122. A database is an organized collection of data. Multidimensional dataset 122 can be implemented with any type of storage device capable of storing data and configuration files that can be accessed and utilized by program 150, such as a database server, a hard disk drive, or a flash memory. Multidimensional dataset 122 is in the form of a data-cube. Multidimensional dataset 122 enables data to be modeled, viewed, and defined in multiple dimensions. In an example, dimensions are the perspectives or entities. Multidimensional dataset 122 is organized around a central theme, for example, sales.

Program 150 is a program for multidimensional cube multivariate regression. Program 150 devises an access mapping layer at the Multidimensional dataset 122 creation containing additional metadata information for associating an ease of data with applicability of machine learning models directly on the multidimensional dataset 122. In various embodiments, program 150 may implement the following steps: facilitate compatibility between one or more multivariate regression models and a multidimensional dataset, wherein the program instructions comprising: extract a plurality of unidimensional chains from the multidimensional dataset; double index the plurality of extracted unidimensional chains; construct a plurality of partial fit regression trees from the double indexed unidimensional chains; responsive to a stop criterion, calculate one or more predictions utilizing the plurality of constructed partial fit regression trees; and repopulate the multidimensional dataset with the one or more calculated predictions. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing machine learning techniques to train, calculate weights, ingest inputs, and output a plurality of solution vectors. In the depicted embodiment, model 152 utilizes multivariate regression to estimate a single regression model with more than one outcome variable with a plurality of predictor variables.

The present invention may contain various accessible data sources, such as multidimensional dataset 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
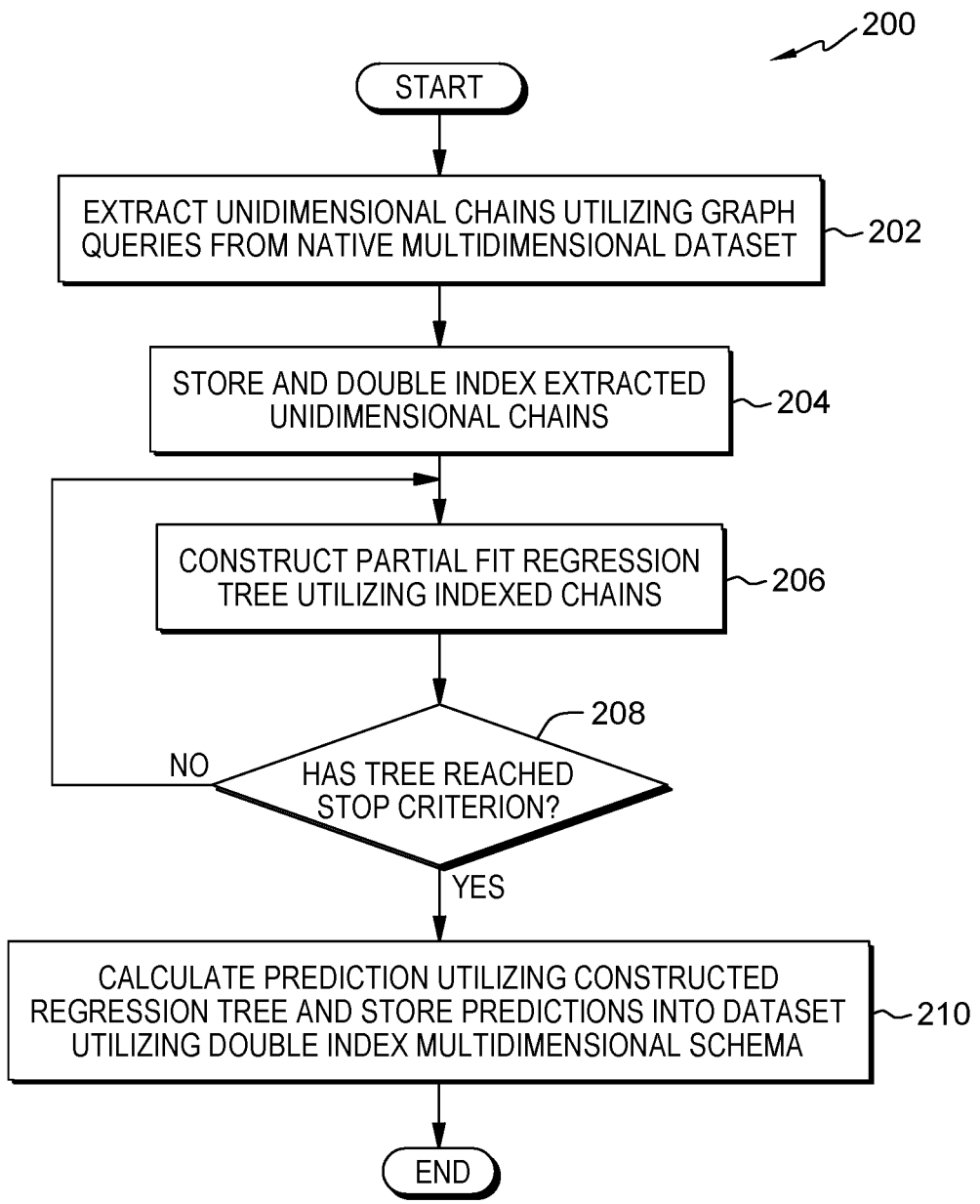
FIG. 2 is a flowchart depicting operational steps of a program, on a server computer within the computational environment of FIG. 1, for multidimensional cube multivariate regression, in accordance with an embodiment of the present invention.

FIG. 2 depicts flowchart 200 illustrating operational steps of program 150 for multidimensional cube multivariate regression, in accordance with an embodiment of the present invention.

Program 150 extracts unidimensional chains utilizing graph queries from a native multidimensional dataset (step 202). In an embodiment, program 150 initiates responsive to a received multidimensional dataset or a received machine learning request utilizing multidimensional dataset 122. In an embodiment, program 150 extracts a plurality of unidimensional chains from multidimensional dataset 122 utilizing graph queries executed against the dataset. In another embodiment, program 150 utilizes a labeled graph as depicted in FIG. 3. In this embodiment, program 150 creates a dominance matrix from labeled graph, where the dominance matrix is a labelled digraph, as depicted in FIG. 3. From the labeled digraph, program 150 generates all subgroups with perfect consistency, allowing program 150 to identify starting points for subsequent unidimensional chain extraction. In an embodiment, responsive to a predetermined consistency criterion, $C_o$, program 150 reduces the dominance graph until at least one chain is identified from each comprised subgraph in the dominance graph. In an embodiment, program 150 defines a dataspace by recursively subdividing said dataspace. In a further embodiment, program 150 removes all redundant chains based on $C_o$. In another embodiment, program 150 adjusts $C_o$ to adjust a number of extracted chains.

Figure 5B:
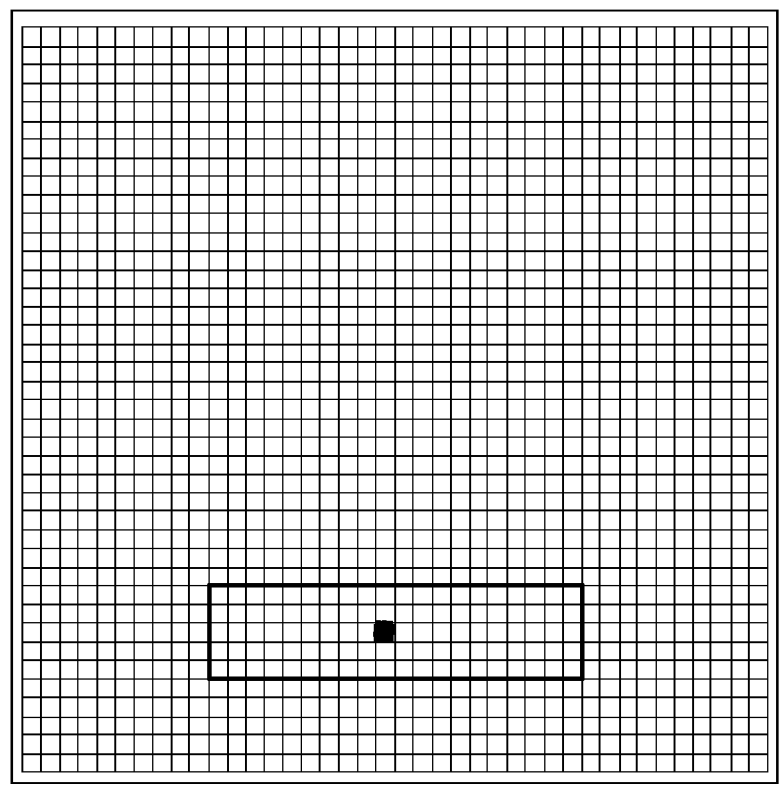
FIGS. 5A and 5B are illustrative block indexes within the computational environment of FIG. 1, in accordance with an embodiment of the present invention.
Figure 5A:
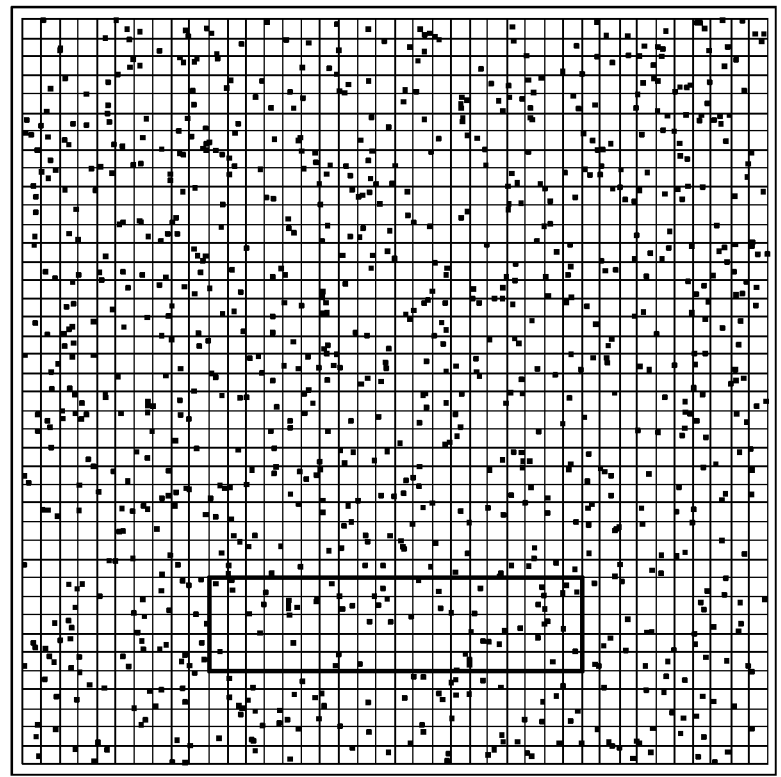

Program 150 stores and reindexes the extracted unidimensional chains utilizing double index (step 204). In an embodiment, program 150 stores and dual indexes all extracted unidimensional chains from step 202. In an embodiment, program 150 stores all new chains natively within multidimensional dataset 122 utilizing a double indexing technique where program 150 block indexes each stored chain (e.g., first chain, second chain, etc.) such that each chain can be subsequently read without the creation of an additional pointer to each chain. Here, the double indexing technique is comprised of representation blocks with hex relationships for accessing the subsequently constructed regression trees, as detailed in step 206. This embodiment adds a primary and a secondary index (i.e., access layer) to cube structure; thereby allowing utilization of unidimensional chains, from multidimensional dataset 122, for multivariate regression. Program 150 first establishes a primary index layer comprising a representation block index (e.g., ripple index) to quickly read the block from the memory. In an embodiment, program 150 access the information referenced by the block index in a single sweep, thus providing maximum reading speeds. FIGS. 5A and 5B demonstrate primary indexing and subsequent rapid accessing of the block.

Concurrently, program 150 initiates secondary indexing which captures relationships between various chains and attributes. In an embodiment, program 150 utilizes a native index system such as a hexastore index. In this embodiment, program 150 utilizes the hexastore index to provide a representation between objects, formed by a subject s, a predicate p, and an object o. Here, the hexastore index results in a sextuple indexing scheme, maintaining six indices, including spo, sop, pso, pos, osp, and ops. Each index structure in the hexastore centers around one element and defines a prioritization between the other two elements. Thus, program 150 utilizes the hexastore index to construct a list of multiple object entries per subject, or vice versa. Hence a particular header for property p is associated to a chain of subjects sp and to a chain of objects op. In addition, a list of associated objects osp is appended to each subject entry in the chain and/or a list of associated subjects sop is appended to each object entry. In an embodiment, program 150 stores and maps uniform resource indicators (URIs) to integer identifiers. In another embodiment, program 150 maintains a mapping table that maps these keys to corresponding strings, amounting to a dictionary encoding. In the depicted embodiment, program 150 spo indexes the extracted unidimensional chains into subject-headed divisions with property chains and lists of objects per chain. FIG. 3B demonstrates the indexing of extracted unidimensional chains, for example as depicted in FIG. 3A. In addition, FIGS. 4A and 4B demonstrate examples of the hexastore index, where elements are stored with a lexicographical index. In another embodiment, program 150 utilizes a composite index to store and traverse new chains.

Program 150 constructs a partial fit regression tree utilizing indexed chains (step 206). In an embodiment, program 150 subdivides or partitions a space (i.e., one or more extracted or related unidimensional chains within a block range) into smaller regions, where the interactions and data quantities are reduced thus more manageable for standard systems. In this embodiment, program 150 recursively partitions multidimensional dataset 122 until program 150 identifies a subdivision or partition capable of fitting model 152 and associated machine learning techniques (e.g., allowing model 152 to utilize comprised data and values based on data structure, data size, data complexity, system computational capabilities, etc.). These embodiments allow large datasets (e.g., multidimensional datasets) with complex features to work with traditional regression methods. In an embodiment, program 150 constructs a global model (i.e., model 152) of linear regression comprising a recursive partition and a model for each cell in the recursive partition. In an embodiment, program 150 constructs a regression tree to represent the recursive partition, as demonstrated in FIG. 6. In the regression tree, each terminal nodes, or leaves each represent a cell of the partition, where program 150 attaches model 152 or any machine learning model. Here, any point x belongs to a leaf if x falls within the corresponding cell of the partition.

Instead of converting multidimensional dataset 122 to a traditional linear structure to perform matrix operations, program 150 utilizes multidimensional dataset 122 by constructing and "growing" a regression tree. In an embodiment, program 150 maximizes information gain from the tree by maximizing I[C; Y], where Y is a dependent variable and C is a variable representing a current leaf position. Here, due to an inability to perform a direct maximization technique on multidimensional data, program 150 performs a greedy search that comprises program 150 identifying a binary question (i.e., split) which maximizes information gain for Y and, responsively, program 150 sets a root node and two daughter nodes to the identified question or split. In a further embodiment, program 150, at each daughter node, recursively continues the above process by identifying a binary question for each daughter node that respectively maximizes information gain for Y. In an embodiment, program 150 continues the described process until reaching a stop criterion such as an information gain threshold.

In various embodiments, program 150 utilizes the following algorithm to grow the regression tree: program 150 starts with a single node or root node, as identified in the previous greedy search, containing all values and points, responsive to all the values or points within the node having equal values for all independent variables, program 150 halts tree construction and continues to step 210 otherwise program 150 searches over all available binary splits of all variables in order to identify a split that reduces an error metric (e.g., sum of squared errors). In this embodiment, if a split associated with the largest decrease in errors would be less than a predetermined threshold, or one of the resulting nodes would contain less than a predetermined minimum threshold of points, data, or values, then program 150 halts tree construction; otherwise, program 150 splits and creates two additional nodes and repeats step 206. In an embodiment, program 150 prunes the resulting tree to avoid overfitting.

If the tree does not reach or exceed a stop criterion ("no" branch, decision block 208), then program 150 returns to step 206 and continues to construct the regression tree. In an embodiment, the constructed tree is a partial fit tree containing branches to undefined subtrees or nodes. Here, program 150 integrates tree construction and pruning operations in order to find a "stable" subtree that can be simplified no further, as described in step 206. In various embodiments, program 150 repeats steps 202-206 until the entirety of multidimensional dataset 122 is read, extracted, stored, indexed, and ready to be accessed. In an embodiment, program 150 supplants a partial fit model for multivariate regression with an additional dimension of one or more extracted chains and new double indexed unidimensional chain. In an embodiment, program 150, responsive to newly extracted chains, reads new chains, reindexes the new chains, and then continues to expand the tree with the newly reindexed chains, only stopping when a stopping criterion is reached. Here, the stored and indexed partial fit trees are form a multivariate regression cube as depicted in FIGS. 8-13.

Figure 13:
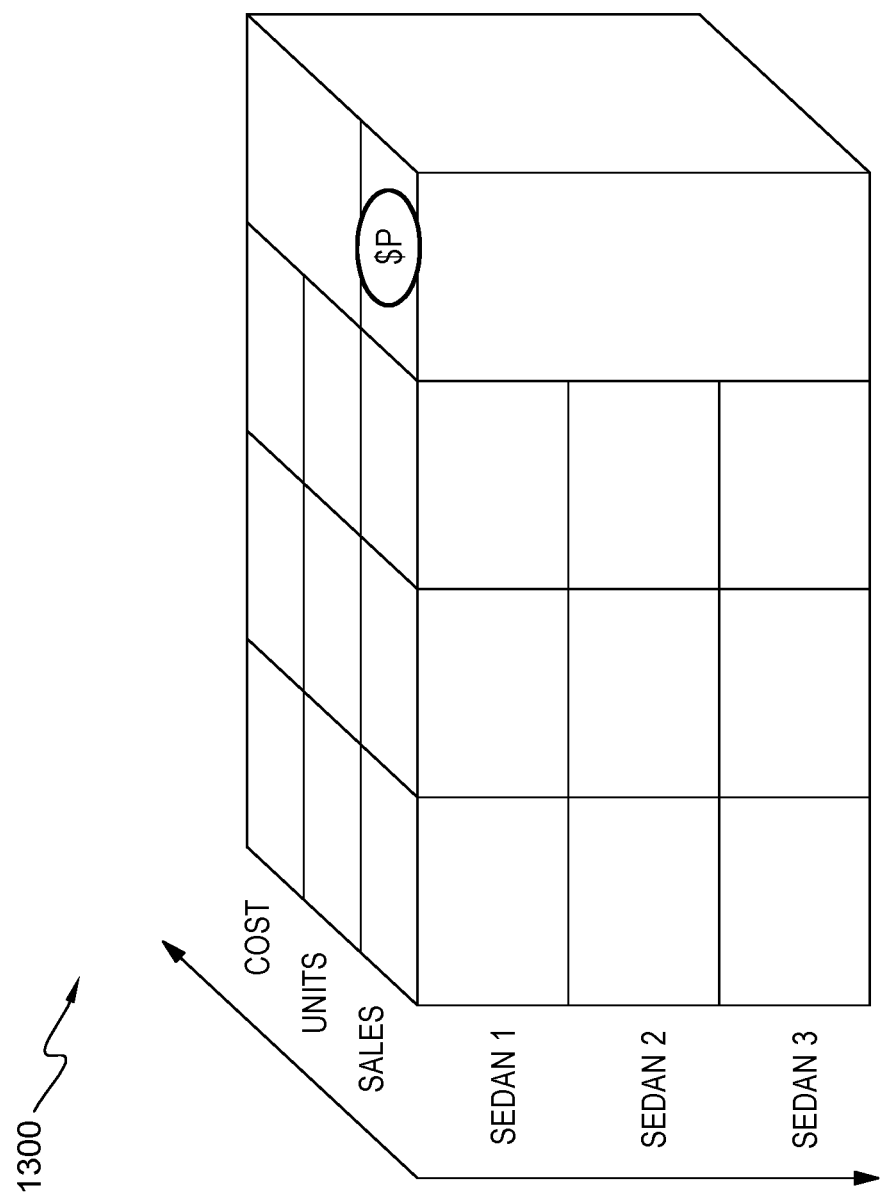
FIG. 13 illustrates a stored prediction cube within the computational environment of FIG. 1, in accordance with an embodiment of the present invention.

If the tree reaches or exceeds a stop criterion ("yes" branch, decision block 208), then program 150 calculates a prediction utilizing the constructed regression tree and stores the prediction into the dataset utilizing a double index multidimensional schema (step 210). In an embodiment, program 150 performs multivariate regression by utilizing one or more constructed regression trees with partial fit extracted by a graph approach. In this embodiment, program 150 predicts values through multivariate regression utilizing the one or more constructed regression trees, then program 150 stores predictions into the cube, as depicted in FIG. 13, and double indexes the stored predictions utilizing double indexing schema described in step 202. In another embodiment, responsive to the computed predicted values, program 150 repopulates the original cube data structure with the predicted ($P) values to be consumed natively. This embodiment results in a multivariate regression cube, allowing program 150 to initiate subsequent multivariate regression utilizing multidimensional dataset 122 without significant overhead and access speed limitations.

FIGS. 3A and 3B depicting matrices 300A and graph 300B, in accordance with an illustrative embodiment of the present invention. Matrices 300A contains created a dominance matrix and a subdivided matrix, as described in step 202. Graph 300B depicts extracted chains that are indexed with a hexastore index capturing relational information for similar unidimensional features.

FIGS. 4A and 4B contain hexastore 400, in accordance with an illustrative embodiment of the present invention. Hexastore 400 provides a representation for relations between elements, comprised within unidimensional chains, formed by a subject, a predicate, and an object. In order to represent this relation program 150 stores elements in lexicographical index, as shown in FIG. 4A. Within hexastore 400, the items are prefixed with the string "spo", representing that the item comprises a subject, predicate, object relation. FIG. 4B demonstrates an exemplary plurality of queries constructed from related items. FIG. 4B demonstrates the following query "who are all the people user1 is friends with". In this example, to retrieve said query, program 150 begins with a "spo" query to "all of the people user1 is friends with".

FIGS. 5A and 5B depict block index 500, in accordance with an illustrative embodiment of the present invention. Block index 500 demonstrates a composite index that allows easy cube traversal and store new chains within the same data structure. Block index 500 shows a data query for all the entities between 50 and 55 years old having a salary between 70000 and 85000 in a cube dataset comprising persons, ages, and salaries. Block index 500 also depicts the addition of a point to the block index. For example, a value or point is added to the x/y coordinate of 10/25. Here, substituting N bits from the index results in a search box of side $2^{N/2}$.

Figure 6:
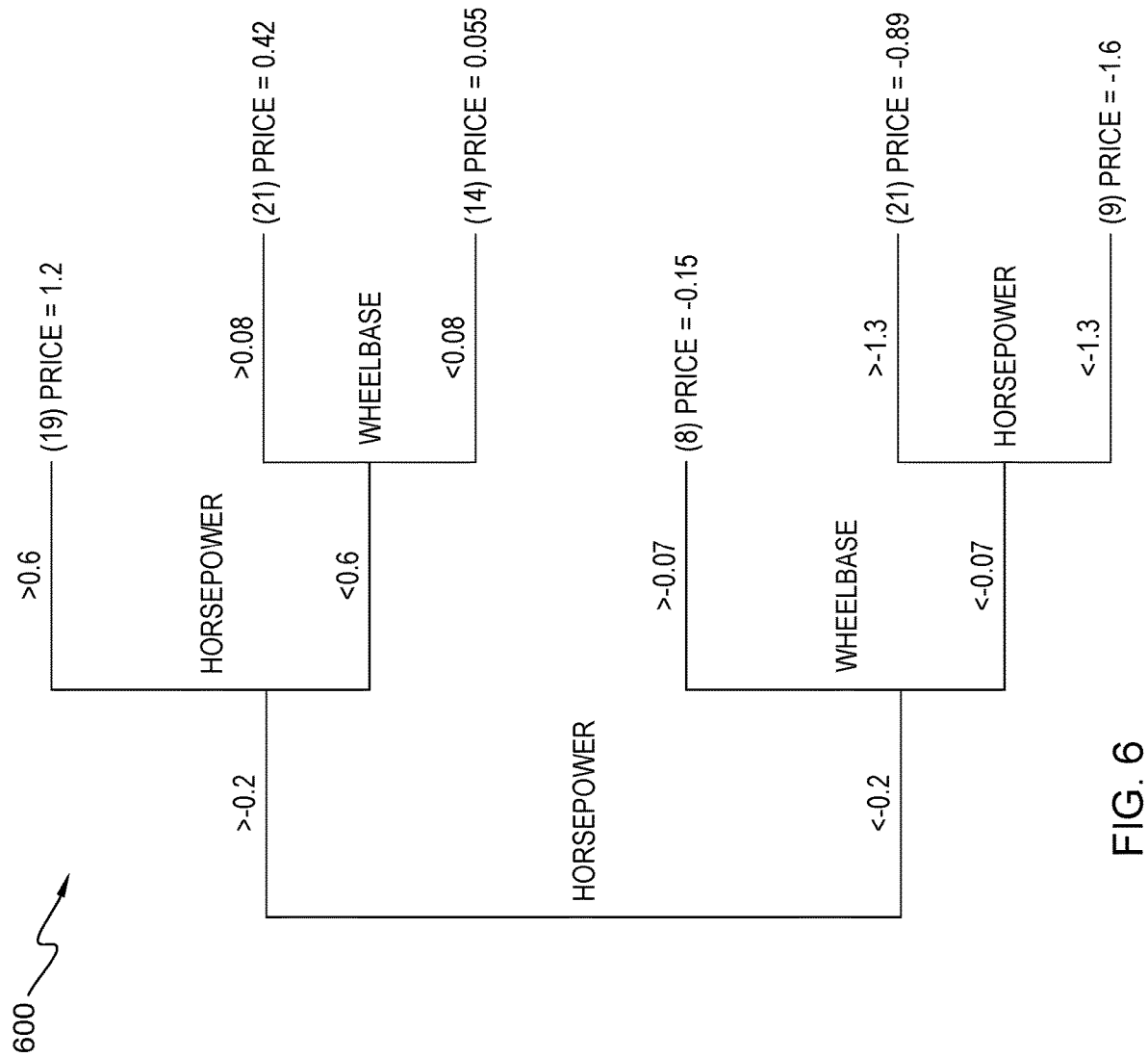
FIG. 6 is an exemplary regression tree within the computational environment of FIG. 1, in accordance with an embodiment of the present invention.

FIG. 6 depicts regression tree 600, in accordance with an illustrative embodiment of the present invention. Regression tree 600 is an exemplary regression tree comprising of horsepower, wheelbase, and price variables. In regression tree 600, each terminal nodes or leaves each represent a cell of the partition, where program 150 attaches model 152 or any machine learning model. Here, any point x belongs to a leaf if x falls within the corresponding cell of the partition.

Figure 7:
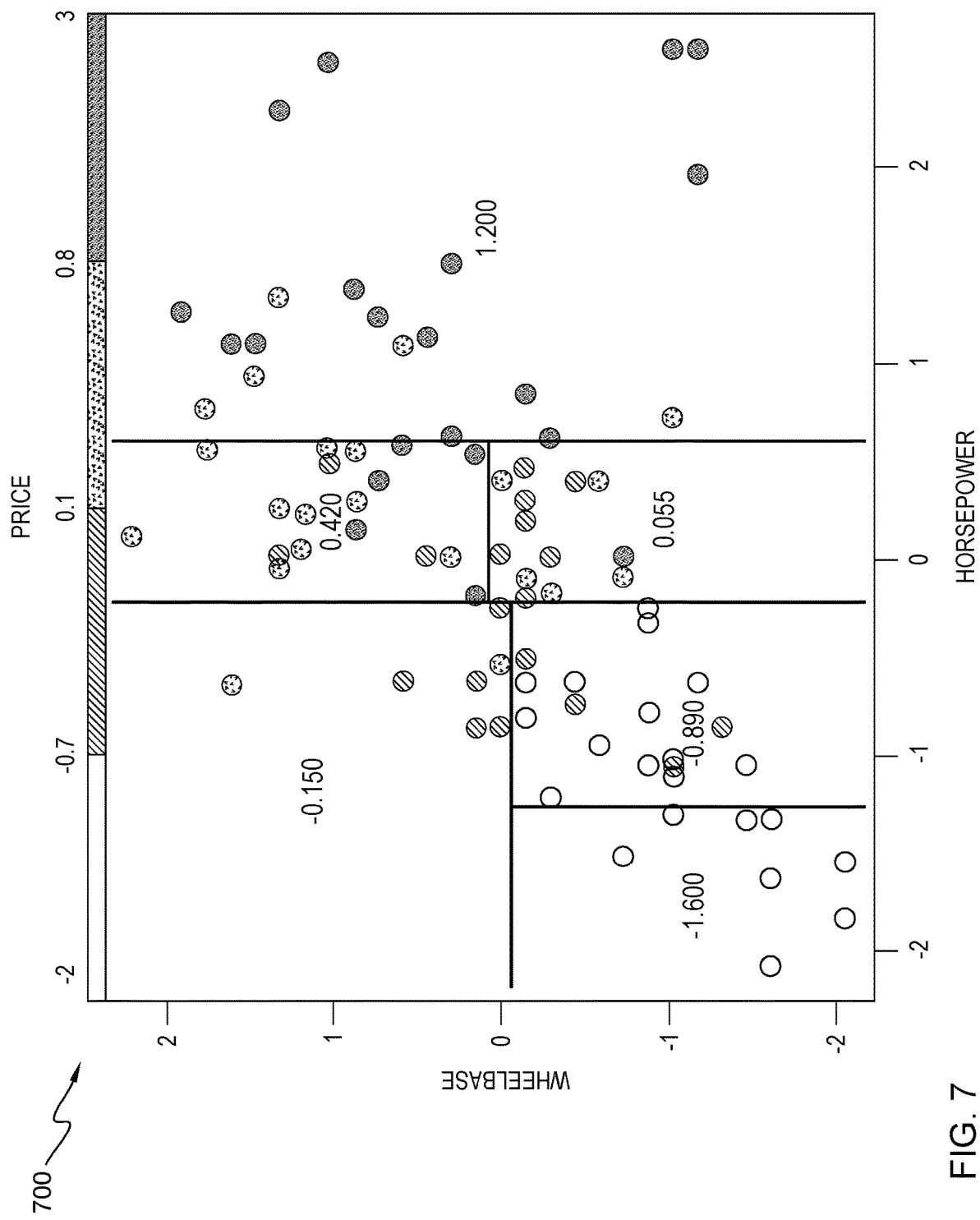
FIG. 7 is an exemplary partition table of the exemplary regression tree within the computational environment of FIG. 1, in accordance with an embodiment of the present invention.

FIG. 7 depicts partitions 700, in accordance with an illustrative embodiment of the present invention. Partitions 700 demonstrates the partitioning of the data provided in regression tree 600 in FIG. 6.

Figure 8:
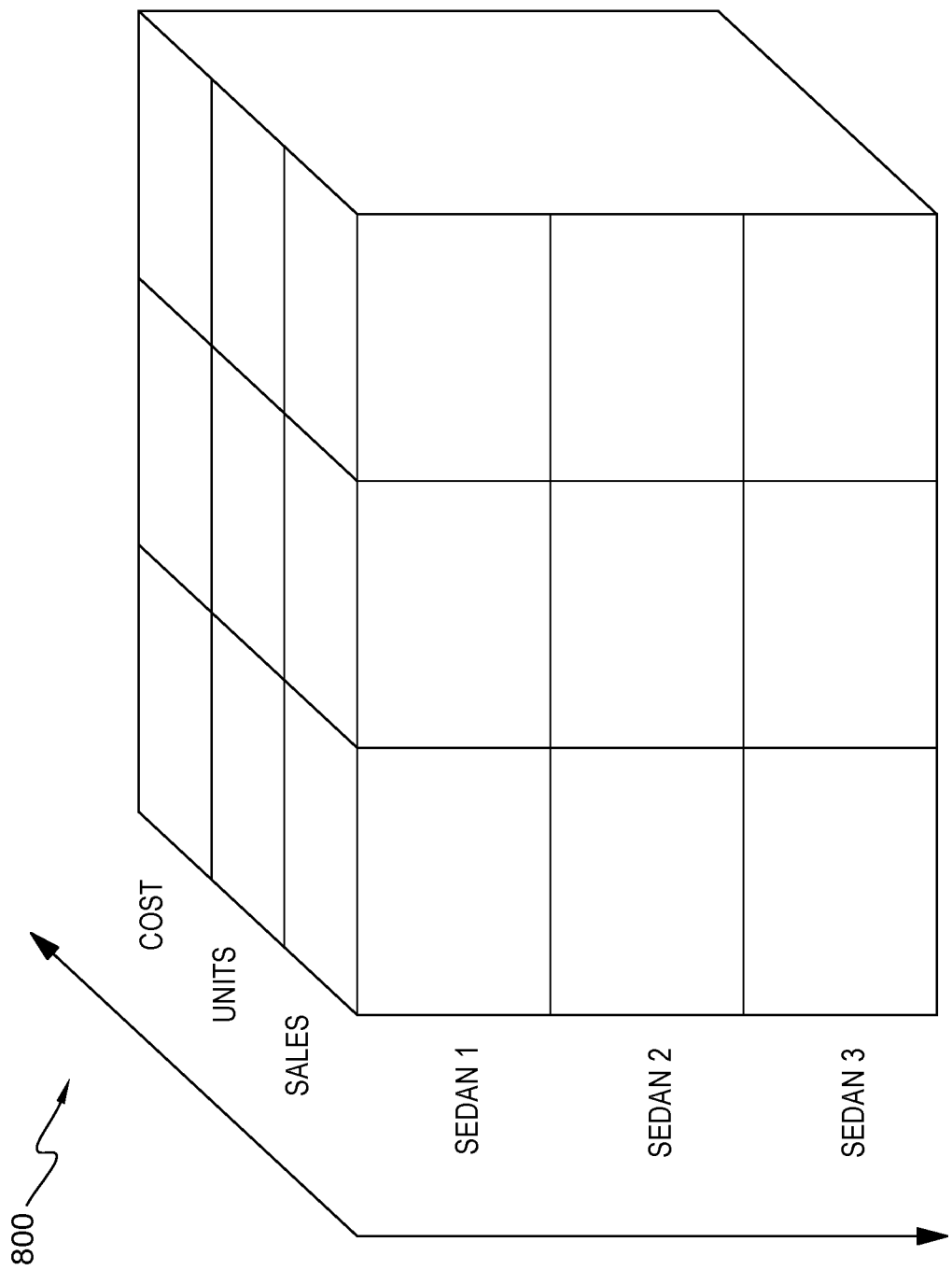
FIG. 8 is an exemplary cube within the computational environment of FIG. 1, in accordance with an embodiment of the present invention.

FIG. 8 depicts cube 800, in accordance with an illustrative embodiment of the present invention. Cube 800 is an exemplary multidimensional dataset comprising entities (i.e., sedans), sales, units, and associated cost.

Figure 9:
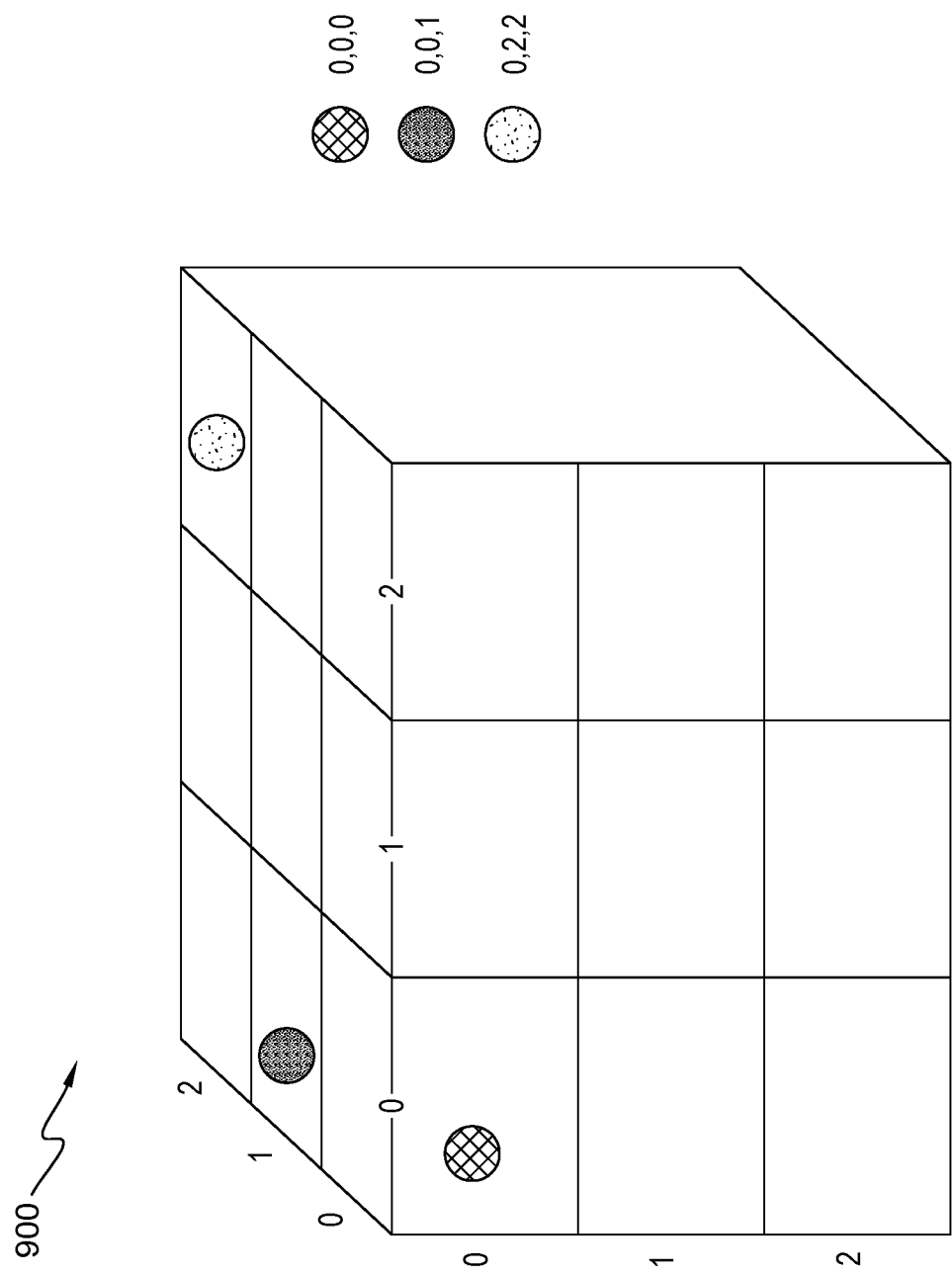
FIG. 9 is an exemplary populated cube within the computational environment of FIG. 1, in accordance with an embodiment of the present invention.

FIG. 9 depicts populated cube 900, in accordance with an illustrative embodiment of the present invention. Populated cube 900 is a multidimensional dataset comprising a plurality of populated objects and associated values.

Figures 10A, 10B, 10C:
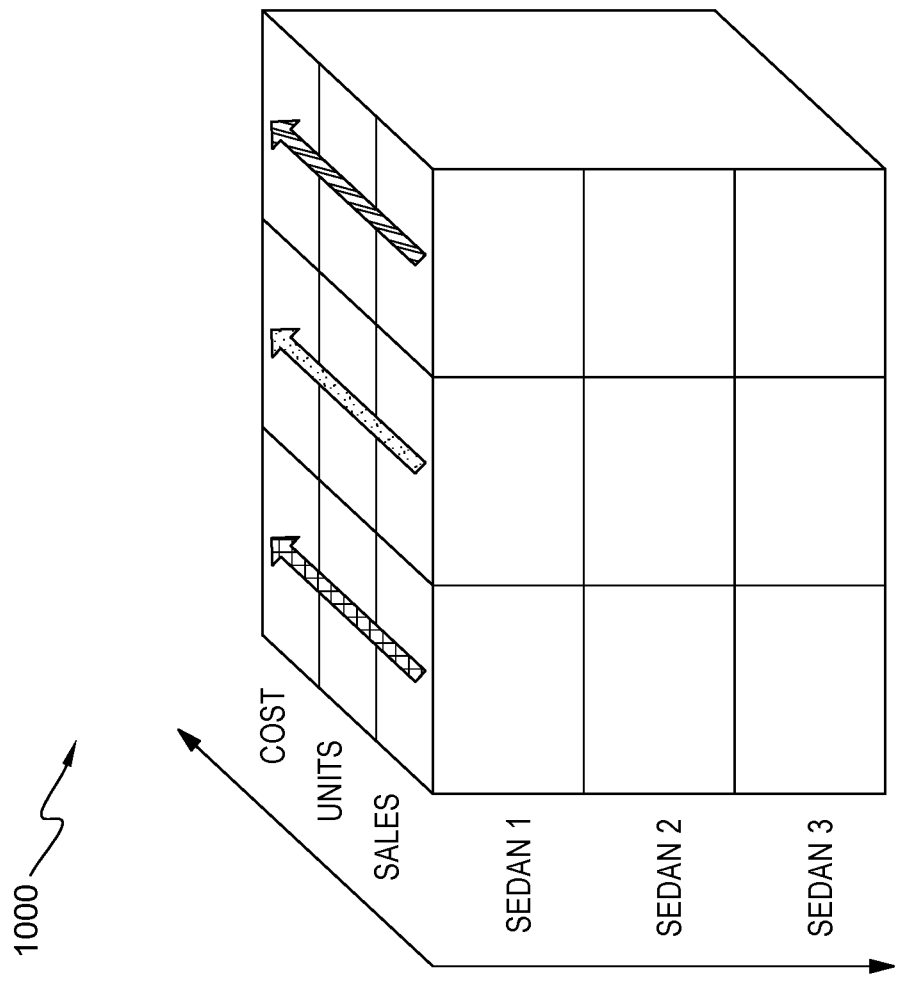
FIGS. 10A, 10B, and 10C illustrate a queried cube within the computational environment of FIG. 1, in accordance with an embodiment of the present invention.

FIGS. 10A, 10B, and 10C depict queried cube 1000, in accordance with an illustrative embodiment of the present invention. Queried cube 1000 depicts a multidimensional dataset being queried for all features associated with Sedan 1. FIG. 10B presents resulting data from the query and FIG. 10C is the programmatic representation of said data, as described in steps 202 and 204.

FIGS. 11A, 11B, and 11C depict multivariate regression cube 1100, in accordance with an illustrative embodiment of the present invention. Multivariate regression cube 1100 depicts a partial regression tree (i.e., FIG. 11C) comprising query data (i.e., FIG. 11B) stored within a multidimensional cube (i.e., FIG. 11A), as described in step 206.

Figure 12B:
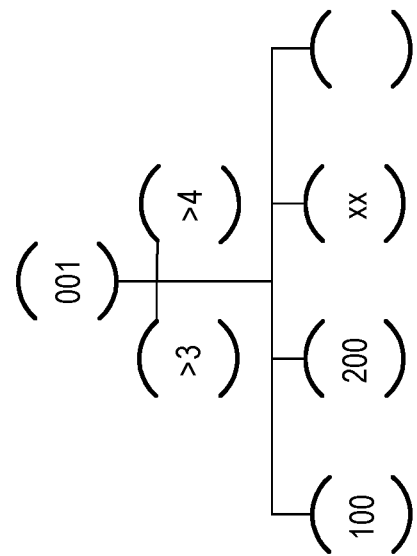
FIGS. 12A and 12B illustrate an expanding cube within the computational environment of FIG. 1, in accordance with an embodiment of the present invention.
Figure 12A:
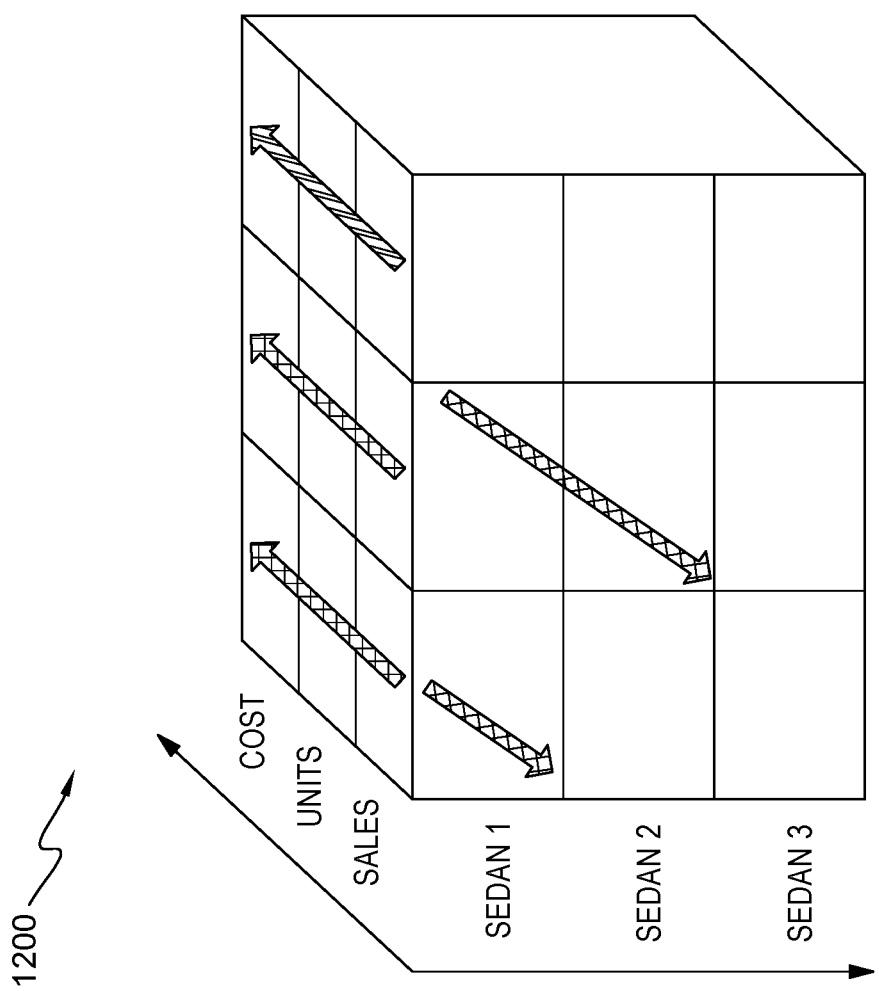

FIGS. 12A and 12B depict expanding cube 1200, in accordance with an illustrative embodiment of the present invention. Expanding cube 1200 represents an expanding multidimensional cube (i.e., FIG. 12A) responsive to new, indexed chains, until a stop criterion (i.e., FIG. 12B) is reached, as described in steps 206 and 208.

FIG. 13 depicts prediction cube 1300, in accordance with an illustrative embodiment of the present invention. Prediction cube 1300 is a representation of a multidimensional cube with a stored, predicted value, as described in step 210.

Figure 14:
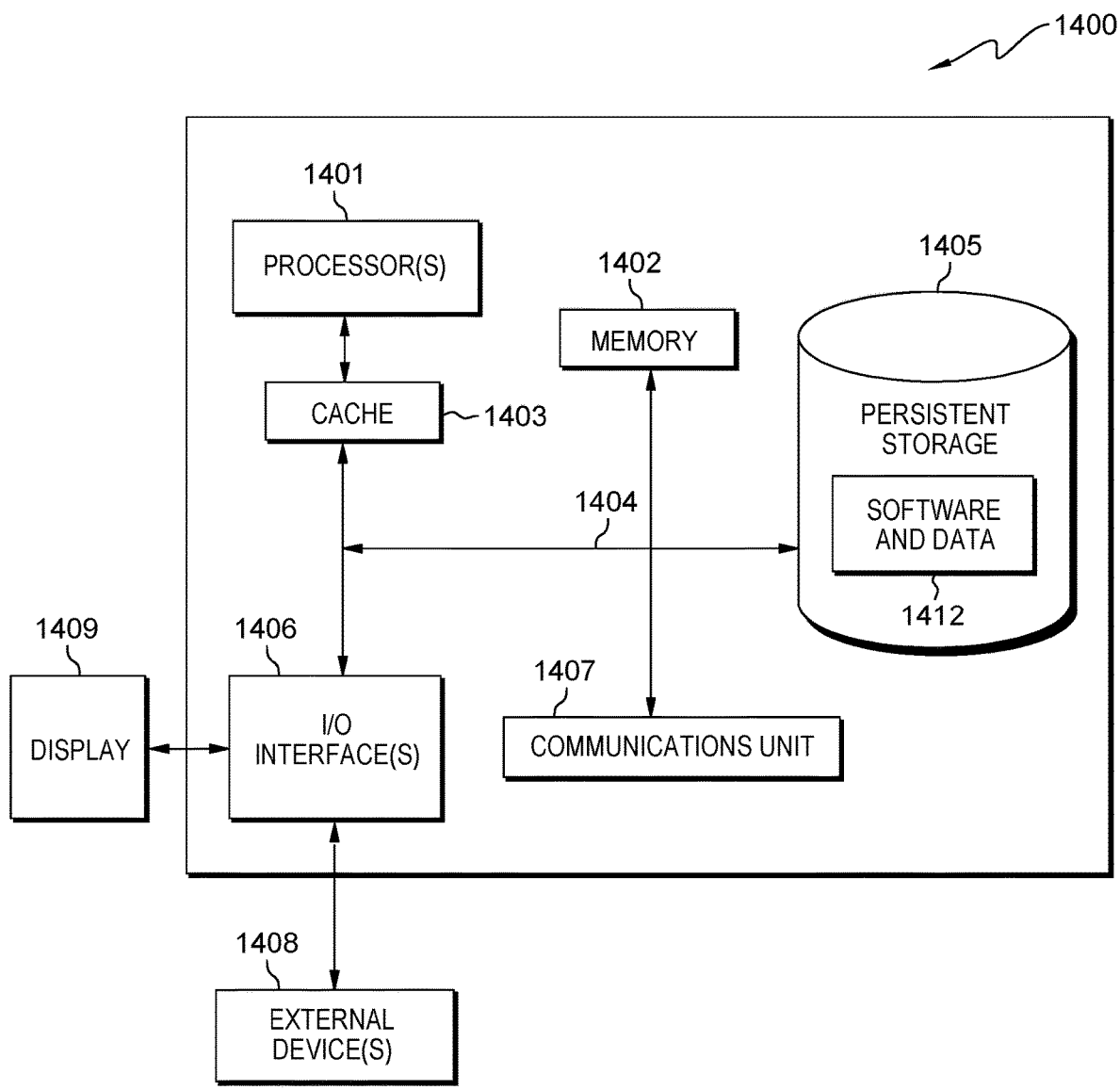
FIG. 14 is a block diagram of components of the server computer, in accordance with an embodiment of the present invention.

FIG. 14 depicts block diagram 1400 illustrating components of server computer 120 in accordance with an illustrative embodiment of the present invention. It should be appreciated that FIG. 14 provides only an illustration of one implementation and does not imply any limitations with regard to the environments in which different embodiments may be implemented. Many modifications to the depicted environment may be made.

Server computer 120 each include communications fabric 1404, which provides communications between cache 1403, memory 1402, persistent storage 1405, communications unit 1407, and input/output (I/O) interface(s) 1406. Communications fabric 1404 can be implemented with any architecture designed for passing data and/or control information between processors (such as microprocessors, communications, and network processors, etc.), system memory, peripheral devices, and any other hardware components within a system. For example, communications fabric 1404 can be implemented with one or more buses or a crossbar switch.

Memory 1402 and persistent storage 1405 are computer readable storage media. In this embodiment, memory 1402 includes random access memory (RAM). In general, memory 1402 can include any suitable volatile or non-volatile computer readable storage media. Cache 1403 is a fast memory that enhances the performance of computer processor(s) 1401 by holding recently accessed data, and data near accessed data, from memory 1402.

Program 150 may be stored in persistent storage 1405 and in memory 1402 for execution by one or more of the respective computer processor(s) 1401 via cache 1403. In an embodiment, persistent storage 1405 includes a magnetic hard disk drive. Alternatively, or in addition to a magnetic hard disk drive, persistent storage 1405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1405 may also be removable. For example, a removable hard drive may be used for persistent storage 1405. Other examples include optical and magnetic disks, thumb drives, and smart cards that are inserted into a drive for transfer onto another computer readable storage medium that is also part of persistent storage 1405. Software and data 1412 can be stored in persistent storage 1405 for access and/or execution by one or more of the respective processors 1401 via cache 1403.

Communications unit 1407, in these examples, provides for communications with other data processing systems or devices. In these examples, communications unit 1407 includes one or more network interface cards. Communications unit 1407 may provide communications through the use of either or both physical and wireless communications links. Program 150 may be downloaded to persistent storage 1405 through communications unit 1407.

I/O interface(s) 1406 allows for input and output of data with other devices that may be connected to server computer 120. For example, I/O interface(s) 1406 may provide a connection to external device(s) 1408, such as a keyboard, a keypad, a touch screen, and/or some other suitable input device. External devices 1408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 1405 via I/O interface(s) 1406. I/O interface(s) 1406 also connect to a display 1409.

Display 1409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
facilitating, by one or more computer processors, compatibility between one or more multivariate regression models and a multidimensional dataset, comprising:
extracting, by one or more computer processors, a plurality of unidimensional chains from the multidimensional dataset;
double indexing, by one or more computer processors, the plurality of extracted unidimensional chains;
constructing, by one or more computer processors, a plurality of partial fit regression trees from the double indexed unidimensional chains, further comprising:
recursively partitioning, by one or more computer processors, the multidimensional dataset until identifying a partition capable of fitting within the one or more multivariate regression models;
responsive to a stop criterion, calculating, by one or more computer processors, one or more predictions utilizing the plurality of constructed partial fit regression trees; and
repopulating, by one or more computer processors, the multidimensional dataset with the one or more calculated predictions.

2. The computer-implemented method of claim 1, wherein the plurality of unidimensional chains is extracted utilizing graph queries executed against the multidimensional dataset.

3. The computer-implemented method of claim 1, wherein the double indexing the plurality of extracted unidimensional chains, comprises:
   block indexing, by one or more computer processors, the plurality of unidimensional chains, wherein a block index is accessed in a single sweep providing maximum read speeds; and
   hexastore indexing, by one or more computer processors, the plurality of unidimensional chains to provide representation between objects, formed by a subject s, a predicate p, and an object o, wherein a hexastore centers around one element and defines a prioritization between the other two elements.

4. The computer-implemented method of claim 1, wherein constructing the plurality of partial fit regression trees from the double indexed unidimensional chains, comprises:
   identifying, by one or more computer processors, a split which maximizes information gain through a greedy search and, responsively, setting a root node and two daughter nodes based on the identified split.

5. The computer-implemented method of claim 1, wherein stop criterion is a split associated with a largest error decrease that is less than a threshold or a result node from the split containing less than a threshold of comprised points, data, or values.

6. The computer-implemented method of claim 1, wherein extracting the plurality of unidimensional chains from the multidimensional dataset, comprises:
   creating, by one or more computer processors, a dominance matrix from a labeled graph, wherein the dominance matrix is a labelled digraph;
   identifying, by one or more computer processors, a plurality of starting points for extracting the plurality of unidimensional chains; and
   reducing, by one or more computer processors, the dominance matrix until at least one unidimensional chain is identified from each comprised subgraph in the dominance matrix.

7. The computer-implemented method of claim 1, further comprising:
   removing, by one or more computer processors, all redundant unidimensional chains based on a consistency criterion.

8. A computer program product comprising:
   one or more computer readable storage media and program instructions stored on the one or more computer readable storage media, the stored program instructions comprising:
   program instructions to facilitate compatibility between one or more multivariate regression models and a multidimensional dataset, wherein the program instructions further comprise:
   program instructions to extract a plurality of unidimensional chains from the multidimensional dataset;
   program instructions to double index the plurality of extracted unidimensional chains;
   program instructions to construct a plurality of partial fit regression trees from the double indexed unidimensional chains, wherein the program instructions further comprise:
   program instructions to recursively partition the multidimensional dataset until identifying a partition capable of fitting within the one or more multivariate regression models;
   program instructions to responsive to a stop criterion, calculate one or more predictions utilizing the plurality of constructed partial fit regression trees; and
   program instructions to repopulate the multidimensional dataset with the one or more calculated predictions.

9. The computer program product of claim 8, wherein the plurality of unidimensional chains is extracted utilizing graph queries executed against the multidimensional dataset.

10. The computer program product of claim 8, wherein the program instructions, to double indexing the plurality of extracted unidimensional chains, comprise:
   program instructions to block index the plurality of unidimensional chains, wherein a block index is accessed in a single sweep providing maximum read speeds; and
   program instructions to hexastore index the plurality of unidimensional chains to provide representation between objects, formed by a subject s, a predicate p, and an object o, wherein a hexastore centers around one element and defines a prioritization between the other two elements.

11. The computer program product of claim 8, wherein the program instructions, to constructing the plurality of partial fit regression trees from the double indexed unidimensional chains, comprise:
   program instructions to identify a split which maximizes information gain through a greedy search and, responsively, setting a root node and two daughter nodes based on the identified split.

12. The computer program product of claim 8, wherein stop criterion is a split associated with a largest error decrease that is less than a threshold or a result node from the split containing less than a threshold of comprised points, data, or values.

13. The computer program product of claim 8, wherein the program instructions, to extract the plurality of unidimensional chains from the multidimensional dataset, comprise:
   program instructions to create a dominance matrix from a labeled graph, wherein the dominance matrix is a labelled digraph;
   program instructions to identify a plurality of starting points for extracting the plurality of unidimensional chains; and
   program instructions to reduce the dominance matrix until at least one unidimensional chain is identified from each comprised subgraph in the dominance matrix.

14. The computer program product of claim 8, wherein the program instructions, stored on the one or more computer readable storage media, further comprise:
   program instructions to remove all redundant unidimensional chains based on a consistency criterion.

15. A computer system comprising:
   one or more computer processors;
   one or more computer readable storage media; and
   program instructions stored on the computer readable storage media for execution by at least one of the one or more processors, the stored program instructions comprising:
   program instructions to facilitate compatibility between one or more multivariate regression models and a multidimensional dataset, wherein the program instructions further comprise:

program instructions to extract a plurality of unidimensional chains from the multidimensional dataset;

program instructions to double index the plurality of extracted unidimensional chains;

program instructions to construct a plurality of partial fit regression trees from the double indexed unidimensional chains, wherein the program instructions further comprise:

program instructions to recursively partition the multidimensional dataset until identifying a partition capable of fitting within the one or more multivariate regression models;

program instructions to responsive to a stop criterion, calculate one or more predictions utilizing the plurality of constructed partial fit regression trees; and program instructions to repopulate the multidimensional dataset with the one or more calculated predictions.

16. The computer system of claim 15, wherein the plurality of unidimensional chains is extracted utilizing graph queries executed against the multidimensional dataset.

17. The computer system of claim 15, wherein the program instructions, to double indexing the plurality of extracted unidimensional chains, comprise:

program instructions to block index the plurality of unidimensional chains, wherein a block index is accessed in a single sweep providing maximum read speeds; and program instructions to hexastore index the plurality of unidimensional chains to provide representation between objects, formed by a subject s, a predicate p, and an object o, wherein a hexastore centers around one element and defines a prioritization between the other two elements.

18. The computer system of claim 15, wherein the program instructions, to constructing the plurality of partial fit regression trees from the double indexed unidimensional chains, comprise:

program instructions to identify a split which maximizes information gain through a greedy search and, responsively, setting a root node and two daughter nodes based on the identified split.

19. The computer system of claim 15, wherein stop criterion is a split associated with a largest error decrease that is less than a threshold or a result node from the split containing less than a threshold of comprised points, data, or values.

20. The computer system of claim 15, wherein the program instructions, to extract the plurality of unidimensional chains from the multidimensional dataset, comprise:

program instructions to create a dominance matrix from a labeled graph, wherein the dominance matrix is a labelled digraph;

program instructions to identify a plurality of starting points for extracting the plurality of unidimensional chains; and program instructions to reduce the dominance matrix until at least one unidimensional chain is identified from each comprised subgraph in the dominance matrix.

* * * * *